(12) United States Patent
Kutcka et al.

(10) Patent No.: US 8,885,921 B2
(45) Date of Patent: Nov. 11, 2014

(54) METHOD AND SYSTEM FOR FORENSIC MARKING OF STEREOSCOPIC 3D CONTENT MEDIA

(75) Inventors: Chris Scott Kutcka, Pasadena, CA (US); Micah Robert Littleton, Simi Valley, CA (US)

(73) Assignee: Thomson Licensing, Issy les Moulineaux (FR)

( * ) Notice: Subject to any disclaimer, the term of this patent is extended or adjusted under 35 U.S.C. 154(b) by 530 days.

(21) Appl. No.: 12/931,655

(22) Filed: Feb. 7, 2011

(65) Prior Publication Data

US 2011/0194728 A1  Aug. 11, 2011

Related U.S. Application Data

(60) Provisional application No. 61/302,520, filed on Feb. 8, 2010.

(51) Int. Cl.
| | |
|---|---|
| *G06K 9/00* | (2006.01) |
| *G03B 35/08* | (2006.01) |
| *G03B 35/00* | (2006.01) |
| *G06T 1/00* | (2006.01) |
| *G02B 27/26* | (2006.01) |
| *G03B 35/18* | (2006.01) |
| *H04N 5/913* | (2006.01) |

(52) U.S. Cl.
CPC .... *G06T 1/0021* (2013.01); *H04N 2005/91357* (2013.01); *G03B 35/08* (2013.01); *G03B 35/00* (2013.01); *G06T 2201/0051* (2013.01); *H04N 5/913* (2013.01); *G02B 27/26* (2013.01); *G03B 35/18* (2013.01)
USPC ........................... 382/154; 382/100; 713/176

(58) Field of Classification Search
USPC .................................. 382/100, 154; 713/176
See application file for complete search history.

(56) References Cited

U.S. PATENT DOCUMENTS

| | | | |
|---|---|---|---|
| 5,481,321 A | 1/1996 | Lipton | |
| 6,333,757 B1 * | 12/2001 | Faris | 348/60 |
| 7,206,409 B2 | 4/2007 | Antonellis et al. | |
| 7,484,100 B1 * | 1/2009 | Grossman | 713/176 |
| 8,032,754 B2 * | 10/2011 | Mihcak et al. | 713/176 |
| 2004/0109016 A1 | 6/2004 | Antonellis et al. | |
| 2005/0259820 A1 * | 11/2005 | Jones | 380/201 |

(Continued)

FOREIGN PATENT DOCUMENTS

| | | |
|---|---|---|
| EP | 1912447 | 4/2008 |
| EP | 2079051 | 7/2009 |
| WO | 2009151424 | 12/2009 |

*Primary Examiner* — Gregory M Desire
(74) *Attorney, Agent, or Firm* — Robert D. Shedd; Wan Yee Cheung

(57) ABSTRACT

Anti-piracy measures for stereoscopic 3D content media displayed in dual lens projection systems are achieved by the forensic marking of each image in a stereoscopic image pair with separate component forensic marks or dots associated with each image of an image pair. In one example, the component mark used for marking one image of the pair is identical to the component forensic mark used for marking the other image of the pair. In another example, the component marks are different from each other. When superimposed over each other in proper alignment, the two component marks form a composite forensic mark. In this latter example, they each lack one or more of the forensic dots or shapes existing in the composite mark, and the component marks may or may not have one or more corresponding forensic dots or shapes in common.

23 Claims, 8 Drawing Sheets

(56) References Cited

U.S. PATENT DOCUMENTS

| | | | |
|---|---|---|---|
| 2006/0169785 A1* | 8/2006 | Jones | 235/491 |
| 2009/0123022 A1 | 5/2009 | Derrenberger et al. | |
| 2010/0037059 A1* | 2/2010 | Sun et al. | 713/176 |
| 2010/0098250 A1* | 4/2010 | Schultz et al. | 380/200 |
| 2011/0085727 A1* | 4/2011 | Yoon et al. | 382/154 |
| 2011/0149023 A1* | 6/2011 | Kamiya et al. | 348/42 |
| 2011/0194728 A1* | 8/2011 | Kutcka et al. | 382/100 |
| 2011/0311128 A1* | 12/2011 | Wilkinson et al. | 382/154 |

* cited by examiner

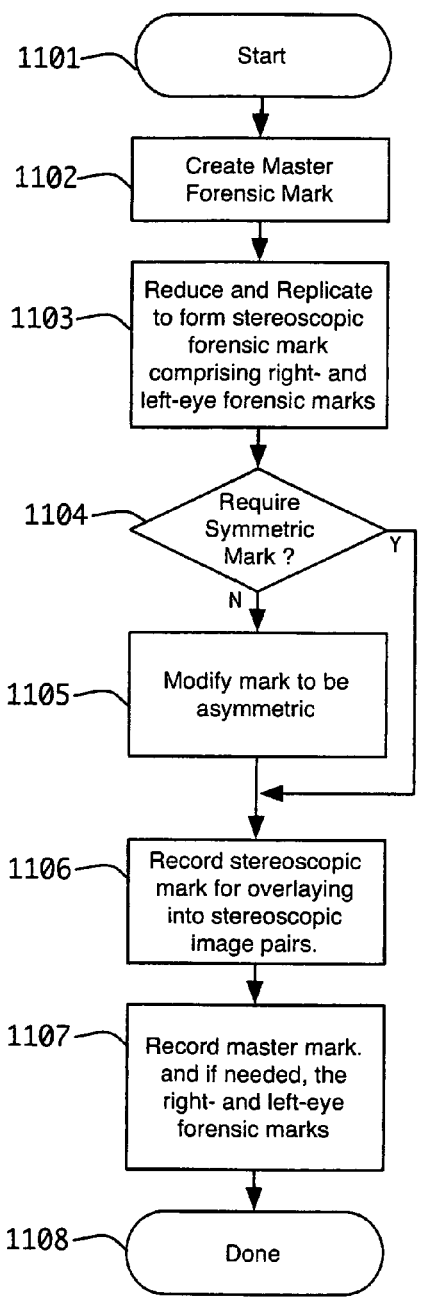
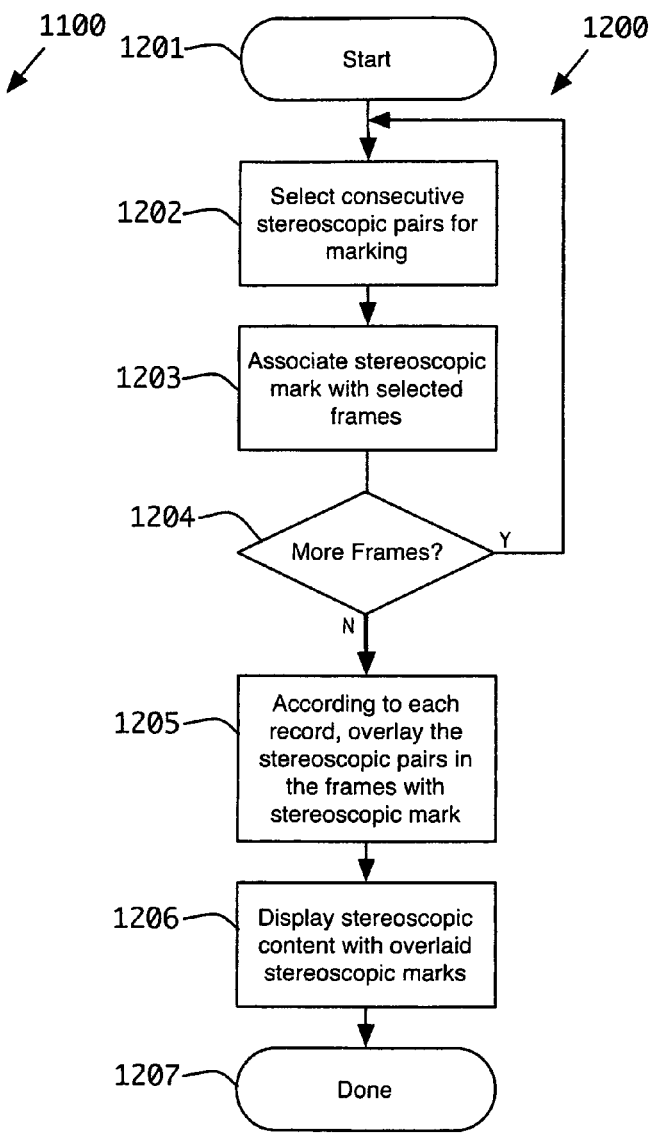
Figure 11
Figure 12

METHOD AND SYSTEM FOR FORENSIC MARKING OF STEREOSCOPIC 3D CONTENT MEDIA

CROSS-REFERENCE TO RELATED APPLICATION

The present patent application claims the benefit of priority from U.S. Provisional Patent Application Ser. No. 61/302,520, "Method and System for Forensic Marking of Stereoscopic 3D Media", filed on Feb. 8, 2010. The teachings of the above-identified provisional patent application are expressly incorporated herein by reference in their entirety.

TECHNICAL FIELD

The present invention relates generally to forensic marking of film and digital cinema media and, more particularly, to the use of indicia or other such marks for forensic marking of stereoscopic 3-dimensional (3D) content media as anti-piracy coding measures.

BACKGROUND OF THE INVENTION

Piracy and illicit copying of film prints erode the revenue stream in the film industry, and also violate the intellectual property rights established for the film media.

Piracy issues in connection with motion pictures and their distribution are well known. Once a film distributor distributes prints of a motion picture film to exhibitors for theatrical exhibition, a certain degree of control over the product is lost. In the regular course of exhibiting the film, a customer in the theater may surreptitiously record the film using, for example, a hand held camcorder or other recording device. At a more sophisticated level, a person seeking to obtain an illegal copy of a film print may gain access to a theater projection booth in collusion with an employee of the exhibitor and make a copy of the film after hours in a relatively controlled environment. In such an environment, the quality of the audio can be greatly improved because the audio tracks can be fed from the projection equipment directly to the recording device. A tripod can even be used to ensure a clearer and steadier picture quality. Alternatively, the print itself may be scanned to create a video master. One way or another, the illicit copy can be made.

Film prints for distribution to exhibition theatres are presently marked in a manner that is visible in illicit copies of the content. Forensic marking is taught is exemplary, patent documents including: U.S. Pat. No. 7,206,409 issued to Antonellis et al., entitled "Motion Picture Anti-Piracy Coding"; and U.S. Patent Application Publication No. 2009/0123022 for Derrenberger et al., entitled "Digital Cinema Projector Watermarking System and Method". These references are expressly incorporated herein by reference in their entirety. Both references show examples of forensic marks applied to non-stereoscopic media content in film and digital cinema forms.

While forensic marking has been applied successfully to non-stereoscopic content (2D), it appears that few, if any, techniques have been developed for stereoscopic content in which stereoscopic 3D motion picture images are projected via dual lens systems using either a single projector or a pair of projectors. Forensic marking techniques, such as those proffered for protecting non-stereoscopic content, have not been proposed in standards organizations or the like for protecting stereoscopic 3D content in a similar manner. Non-stereoscopic forensic marking techniques have not been successfully applied to stereoscopic 3D motion pictures projected from dual lens projection systems. It is expected that the application of marking techniques similar to those in the cited references, when applied to stereoscopic 3D motion picture presentations in the manner shown below, would result in the forensic marks losing at least some amount of their effectiveness and usefulness because of possible corruption and degraded detectability.

The known prior methods and apparatus appear to lack any suitable anti-piracy measures involving forensic marking of stereoscopic 3D media, whether film-based or digital cinema.

SUMMARY OF THE INVENTION

Anti-piracy measures for stereoscopic 3D content media displayed in dual lens projection systems are achieved in accordance with the principles of the present invention by forensic marking of each image (e.g., left-eye and right-eye image) of a number of stereoscopic image pairs with separate component forensic marks (e.g., each being a constellation or set of dots or geometric shapes) associated with each image of the image pairs. In one embodiment, the component constellation used for marking one image of the pair is identical to the component constellation of forensic marks used for marking the other image of the pair. In an alternate embodiment, the component marks are different from each other. When superimposed over each other in proper alignment, the two component marks form a composite forensic mark. In this latter embodiment, the component marks each lack one or more of the forensic dots or geometric shapes existing in the composite mark (which is similar to a master forensic mark used for deriving the component marks) and they may have one or more corresponding forensic dots or shapes in common, although the latter is not necessarily required.

Detectability and visibility of the forensic marks realized in accordance with the principles of the present invention are improved by selecting image pairs having certain characteristics and by positioning the component constellations in certain areas of the images that exhibit other characteristics. For example, it is preferred that marks be applied to image sequences selected for exhibiting limited, slow motion or substantially stationary characteristic. Also, preferred areas within each image pair selected for application of the forensic mark typically exhibit non-negative disparity, i.e., zero or positive disparity. Additionally, other factors such as density, lighting, and coloration of the elements in an image area within which the forensic constellations are to be applied are considered for enhancing contrast and visibility with the mark.

One embodiment provides a stereoscopic film that includes a plurality of stereoscopic image pairs arranged in sequential order, a first forensic mark formed over a portion of a first image of a stereoscopic pair, and a second forensic mark formed over a portion of the second image of the stereoscopic pair, with the portion of the second image corresponding spatially to the portion of the first image. Each of the first and second forensic marks includes a plurality of forensic dots, and which collectively produce a composite forensic mark when the forensic marks are superimposed on each other.

Another embodiment provides a method for forensic marking of a stereoscopic film having a plurality of stereoscopic image pairs arranged in sequential order. The method includes providing a master forensic mark comprising a plurality of forensic dots arranged in a desired pattern, forming a first forensic mark based on the master forensic mark for application to a first image of a stereoscopic pair, forming a second forensic mark by replicating the master forensic mark for application to a second image of the stereoscopic pair. An aligned superposition of the first and second forensic marks over each other produces a composite forensic mark exhibiting substantially identical characteristics to the master forensic mark with respect to a total number of forensic dots in the master forensic mark and with respect to a spatial representation of the master forensic mark.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, in which:

FIG. 11 illustrates a method for making stereoscopic forensic marks in accordance with the principles of the present invention; and FIG. 12 illustrates a method for applying stereoscopic forensic marks in accordance with the principles of the present invention.

The exemplary embodiments set forth herein illustrate preferred embodiments of the invention, and such exemplary embodiments are not to be construed as limiting the scope of the invention in any manner.

DETAILED DESCRIPTION

The following description presents the inventive concepts in reference to an exemplary dual lens projection system used for presenting stereoscopic 3D motion pictures. A brief explanation is given for the problems that arise when a non-stereoscopic forensic mark is applied to stereoscopic images which are projected normally through the dual lens systems. Finally, several embodiments of the inventive concepts are presented for forensically marking stereoscopic 3D motion pictures that are to be displayed via dual lens projection systems.

Details of one or more implementations are set forth herein and in the accompanying drawings. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations.

Existing 3D projection systems use a single standard 2D film projector having a dual lens system to project simultaneously each of two images from a stereoscopic pair—one image is projected for the left eye and the other is projected for the right eye. Inline filtering for each of the left- and right-eye halves of the dual lens—typically the bottom and top lenses, respectively—in the projection system encodes the corresponding left- and right-eye images of a stereoscopic pair. When the encoded image pair is projected onto a theater screen, audience members wearing glasses that include appropriate, properly oriented filters corresponding to those of the dual lens system, will perceive the left-eye image in their left eyes, and the right-eye image in their right eyes.

Figure 1:
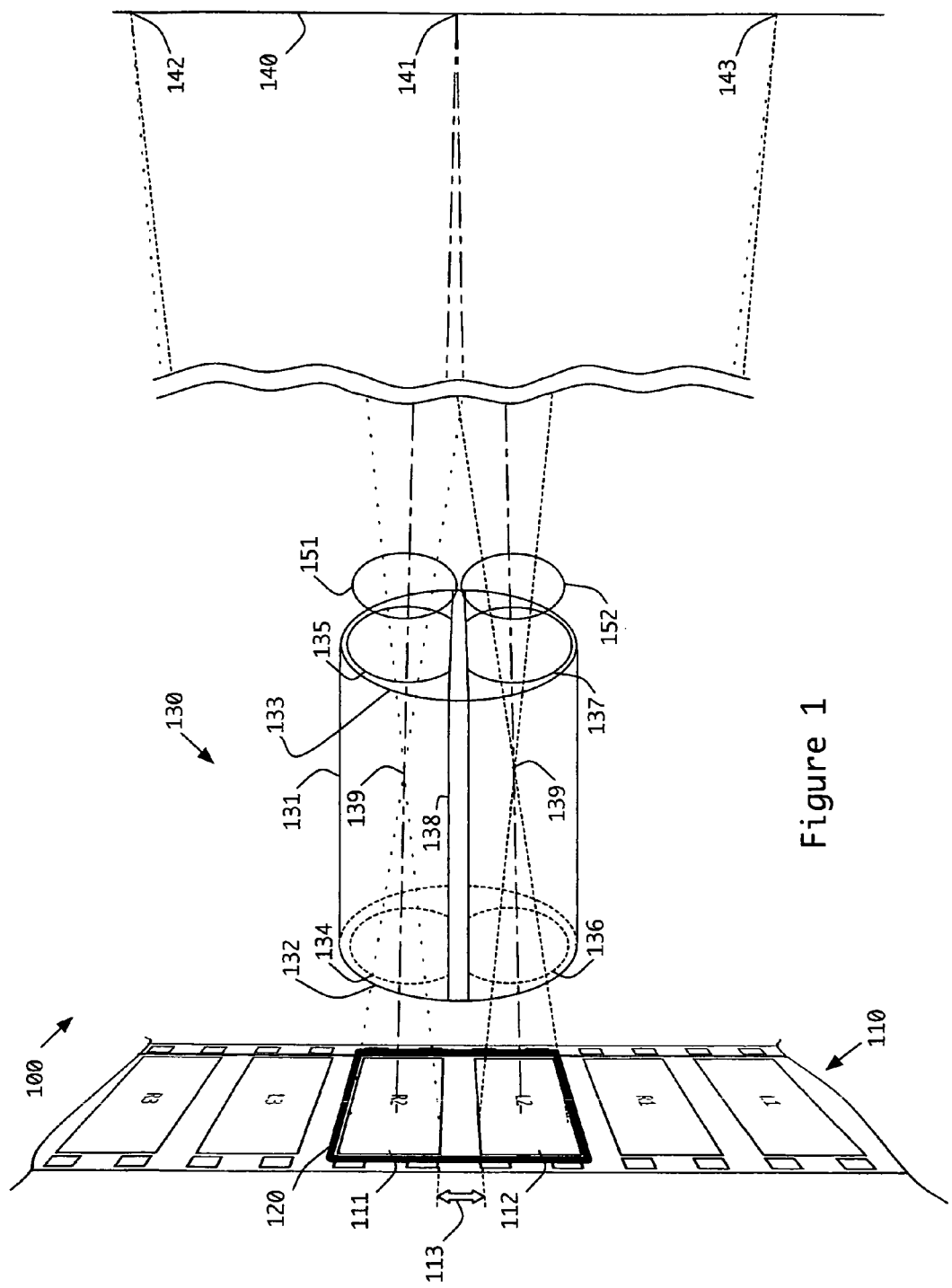
FIG. 1 illustrates a stereoscopic film projection system using a dual lens configuration.

FIG. 1 shows an over-under lens 3D film projection system 100, also called a dual-lens 3D film projection system or projector. Rectangular left-eye image 112 and rectangular right-eye image 111, both on 3D film 110 and shown as being properly framed in the aperture plate, are simultaneously illuminated by a light source and condenser optics (not shown in the figure), collectively called an illuminator, which is located behind the film while framed by aperture plate 120 such that all other images on film 110 are not visible because these images are covered or otherwise obscured by the opaque portion of the aperture plate. It will be apparent to persons skilled in this art that primarily the inner edge of the aperture is illustrated in this figure for clarity purposes. The left- and right-eye images, which together form a stereoscopic image pair and are visible through aperture plate 120, are projected by over-under lens system 130 onto screen 140 where the images are generally aligned and superimposed on each other such that the tops of both projected images are aligned at the top edge 142 of the screen viewing area, and the bottoms of the projected images are aligned at the bottom edge 143 of the screen viewing area.

Film projector 100, which is depicted not to scale, includes an illuminator which usually includes a high intensity lamp such as an arc lamp having envelope, at the center of which is a luminous arc. An elliptically shaped reflector can be used in the projector for reflecting light rays from the luminous arc near the first focal point of the ellipse to form an image of the arc near the second focal point of the ellipse. In most film projectors, the image of the luminous arc is formed at or near the film gate, which is depicted as an aperture cut into an aperture plate. This aperture is depicted in FIG. 1 as an opening for which only the boundary of the opening in the aperture plate is shown. In this way, the illumination from the luminous arc is provided as a smooth field, providing adequate illumination over the entirety of the opening for the aperture of aperture plate 120. It should be noted that element 120 may be referenced herein interchangeably by the terms "aperture" and "aperture plate" without any confusion, limitation, or loss of generality.

Stereoscopic film 110 comprises a film substrate having a row of perforations along each edge. The perforations allow for engagement by a sprocket or other such mechanism (none shown) to advance the film smoothly and continuously from one image to the next. As mentioned above, the images on film 110 are grouped in pairs of left and right images. Stereoscopic image pairs (R1, L1), (R2, L2), and (R3, L3) as shown in FIG. 1 are sequential and adjacent image pairs provided along film 110. For example, the stereoscopic image pair including images R2 and L2 corresponds to a right-eye image 111 and left-eye image 112, respectively. Both images from a stereoscopic image pair are simultaneously illuminated while within the opening formed by aperture of aperture plate 120. Images in the same stereoscopic pair such as images 111 (R2) and 133 (L2) are separated from each other by a gap defined as intra-frame gap 113. Consecutive stereoscopic image pairs, or two adjacent images (e.g., left- and right-eye images) belonging to different stereoscopic image pairs, are separated from each other by a gap defined as inter-frame gap (not shown). The inter-frame gap may or may not exhibit the same dimensions as intra-frame gap 113. Due to the inverting nature of the projector system 100, the images on the film are provided in the projector in an inverted manner such that each image will be shown in its upright or erect orientation when projected on the screen.

Other stereoscopic pairs are shown in FIG. 1, with the lowest two images forming the first stereoscopic pair (L1, R1), and the two uppermost images forming the third stereoscopic pair (L3, R3).

Film print 110, also known as film stock, has a number of stereoscopic image pairs arranged in an uninterrupted sequence of alternating right- and left-images. Right- and left-eye images 112 and 111, respectively, of the same stereoscopic pair (R2, L2) are representative images in the film reel. Right-eye image 111 and left-eye image 112 are each bounded by a respective frame boundary. As such, the left and right eye images are often referenced as a frame. The frame boundary, in turn, defines a maximum extent for a corresponding projected image. In one example, this frame boundary corresponds to the maximum extent of an image having a standard width (W) of 0.825" on the film, based on a well known film format. It should be appreciated that the distinct frame boundaries shown in the Figures are not generally present or actually visible on the film. Instead, each rectangle can be considered as a virtual geometric entity to assist in the definition and understanding of image and non-image areas on the film. The size of the rectangular area is usually set by standard or convention. Regions inside the frame boundaries are considered as image areas, and generally contain image content.

Actual dimensions for each frame boundary are typically determined in accordance with the format selected for the stereoscopic presentation. In one exemplary embodiment, the dimensions for a standard 35 mm film run a four-perforation inter-frame height of 0.748 inches. The height of a stereoscopic image can be determined as half of the inter-frame height less half the sum of the intra-frame gap and inter-frame gap. With a 0.825" maximum image width and an aspect ratio of 2.39:1 (scope) for each image, the image height will be about 0.345". For a symmetric frame gap configuration, in which the inter-frame gap equals the intra-frame gap, the gap distance will be approximately 0.029". Clearly, these gap dimensions will be different for an asymmetric gap configuration. In other embodiments that are based on different film formats or standards, different dimensions may apply. It should be understood that the principles of the present invention apply equally to all known film formats or standards and to both asymmetric and symmetric gap configurations.

Outer edges (not shown in detail) beyond the frame boundaries represent the expected extent of the camera aperture. That is, outer edges generally delineate that portion of film print 110 corresponding to the portion of a film negative that would be exposed by a camera or a film recorder. Ancillary information may be introduced onto the film beyond the outer edges. For example, analog optical sound tracks (not shown) can be placed on the film beyond the outer edges. Similarly, digital optical sound tracks (not shown), such as an inter-perforation sound track and an extra-perforation digital sound track, can be positioned on the film beyond the outer edges. Perforations are also formed on the film in the region beyond the outer edges of the frame boundaries as shown in the figure. Outer edges are not generally marked on the film but are virtual geometric entities which are governed in practice by standards and industry conventions.

Lens system 130 comprises lens body 131 having an entrance end 132 and an exit end 133. Entrance end 132 faces film 110 and exit end 133 faces screen 140. In this embodiment, lens system 130 is a stereoscopic dual lens having an upper portion for projecting right-eye images and a lower portion for projecting left-eye images. The upper portion of lens system 130 includes entrance lens element 134 on the film side and exit lens element 135 on the screen side. The lower portion of the lens system includes entrance lens element 136 on the film side and exit lens element 137 on the screen side. Upper and lower portions of lens system 130 are separated by septum 138. Septum 138 is used to prevent leakage of light between the upper and lower portions of the lens system. In certain cases, septum 138 can be embodied as a gap that is controllably adjustable by an adjustment element to have a variable gap width that can be expanded or contracted. For this latter embodiment, the gap is lined with a coating or the like to prevent leakage of light between the upper and lower portions of the lens system.

Additional lens elements and aperture stops may be included in the projection system, although not shown herein. For example a magnifier (not shown) following the exit end of dual lens 130 may also be added, when appropriate in order to facilitate proper adjustment of the projection system 100.

Projection screen 140 has viewing area delineated by a top 142 and bottom 143. In the center portion of screen 140 lies center point 141 at which the projection of film images 112 and 111 should ideally be centered. When properly aligned, the projections of right-eye image 111 and left-eye image 112 are substantially superimposed on screen 140. Both projected images have their respective centers substantially co-located at screen center 141, as represented in FIG. 1 by the convergence of the center or prime rays (depicted as long/short dashed centerlines) onto point 141. Upon projection, the tops of images 111 and 112 are both imaged substantially along top 142 of screen 140, and the bottom of images 111 and 112 are both projected substantially along bottom 143 of screen 140.

In a properly-adjusted projection system 100, the prime or center ray associated with the center of image 111 propagates through the center of corresponding aperture stop 139 to screen center 141. Likewise, the prime or center ray associated with the center of image 112 propagates through the center of corresponding aperture stop 139' to screen center 141. The top and bottom of projected image 111 are represented by very short dashed rays, whereas the top and bottom of projected image 112 are represented by densely dashed (medium size) rays. When properly aligned, the top and bottom rays of the two projected images substantially converge with each other, aligned with the screen top edge 142 and screen bottom edge 143.

When polarizing components, such as linear or circular polarizers, are employed in the projection system, it is expected that screen 140 should exhibit a polarization preserving property. One such polarization preserving type of screen is a silver screen. On the other hand, when polarizing components are not employed in the system, screen 140 may be realized without the need for a polarization preserving property. For the example described herein, it is preferred that the screen exhibit a polarization preserving property.

The lens system 130 generally includes a filter module for encoding the images. This filter module can include one or more of any of linear or circular polarizers or other non-polarizing filter elements or shutters, such as red/blue filters for anaglyphic 3D or multi-band interference filters, all of which are well known in the art and are suitable for separating the right- and left-eye images so that an audience member can perceive a stereoscopic 3D presentation. In one example, the use of active shutter glasses together with a timed shutter is contemplated. Audience members are supplied with active shutter glasses using exemplary LCD shutters for alternating between blocking light transmission to the left or right eye. The glasses operate in synchronism with a similarly-timed shutter operating in the projection system for extinguishing the projection of the corresponding film image on the screen.

In projection system 100, each of the left- and right-eye images 112 and 111 are projected through left- and right-eye encoder filters, respectively. The encoder filters, which are also known as projection filters, are depicted as left-eye specific filter 152 and right-eye specific filter 151 in this figure. In order to decode the encoded images properly, each audience member is provided with a pair of 3D glasses (none shown) to wear, such that the right eye of each audience member is looking through a right-eye decoder filter while the left eye is looking through a left-eye decoder filter. The decoder filter is also known as a viewing filter. The pair of left-eye encoder and decoder filters is selected to allow the left eye to view the projection of left-eye image 112 on screen 140. This pair does not allow the left eye to view the projection of right-eye image 111. Similarly, the pair of right-eye encoding and decoding filters is selected to allow the right eye to see only the projection of right-eye image 111 on screen 140, without seeing any part of left-eye image 112.

In one example from experimental practice, filter 151 is an absorbing linear polarizer having a vertical orientation. This filter is positioned after exit lens 135. In a similar manner, an absorbing linear polarizer 152 having horizontal orientation is placed after exit lens 137. Screen 140 is an exemplary polarization preserving projection screen, such as a silver screen. Audience members wear glasses (not shown) comprising a right-eye linear polarizer having vertical axis of polarization and a left-eye linear polarizer having a horizontal axis of polarization. In this example, the right-eye image 111 projected through the top half of dual lens 130 is vertically polarized upon passing through the polarizer 151 at exit 135 and that vertical polarization is preserved as the projected image is reflected by screen 140 to the viewing audience members. When viewed by the audience, the right-eye linear polarizer of the supplied glasses allows the right-eye of the viewer to see the projection of right-eye image 111 since the polarizations of the images and the glasses are aligned. Left-eye linear polarizer of the glasses blocks the left-eye of the viewer from seeing the projection of right-eye image 111 since the polarizations are crossed—the horizontal polarization axis of the left-eye lens is crossed with the vertical polarization of the projected right eye image. Left-eye linear polarizer of the supplied glasses allows the left-eye of the viewer to see the projection of left-eye image 112 since the horizontal polarizations of the images and the glasses are aligned. Right-eye linear polarizer of the glasses blocks the right-eye of the viewer from seeing the projection of left-eye image 112 since the polarizations are crossed—the vertical polarization axis of the right-eye lens is crossed with the horizontal polarization of the projected left eye image.

Other combinations for encoder filters and decoder filters are known in the art and can be employed herein. These combinations can include linear polarizers and interference comb filters and the like.

In the description herein, various terms may be used to explain the marks placed on the film in accordance with the principles of the present invention. These terms may include "mark(s)", "indicia", "dots", "points", "constellations", and the like in reference to the forensic marks. The use of any or all of these terms and other similar terms is intended to convey the same meaning without limitation or modification, unless expressly stated to the contrary.

Figure 2:
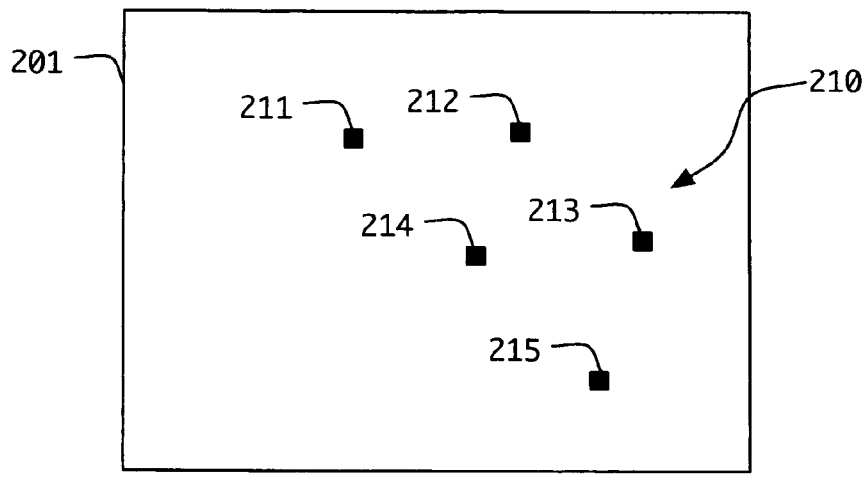
FIG. 2 illustrates a non-stereoscopic frame including a non-stereoscopic forensic mark.

FIG. 2 shows a typical frame 201 for an image of non-stereoscopic (2D) content. Frame 201 may be embodied as a frame of film, a single frame of video, or the content of a digital cinema image file. Frame 201 contains forensic mark 210 that includes a single constellation of dots 211-215. In order to achieve sufficient visibility for detection purposes, dots 211-215 are realized in a manner that allows them to exhibit a reasonable amount of contrast with the image content (not shown) of frame 201. In this way, dots 211-215 are clearly visible when displayed with the image content so that they can leave an imprint on illicit recordings of the content. Details about the constellations and characteristics for forensic marking of non-stereoscopic content media are found in the Antonellis patent cited above.

For a film implementation, dots 211-215 may be realized as a pattern exposed to the film print as part of the film replication process, or the dots may be burned into the film substrate with a laser, for example, before or after the film has been printed in the production process.

For a digital cinema implementation, dots 211-215 may be recorded integrally with the image in the image content file, or the forensic mark may be recorded in a separate overlay file which is then composited with a separate image content file at the time of playout. Playout may occur from the server or the projector, using exemplary subtitling mechanisms well-known in digital cinema exhibition.

When the non-stereoscopic frame 201 with its forensic mark 210 is displayed with a non-stereoscopic projector, the resulting presentation will appear on a projection screen or display monitor substantially as depicted in FIG. 2, although the image may be inverted in accordance with the properties of the projection optics.

However, the same is not true if forensic mark 210 is used in conjunction with stereoscopic images presented through a dual lens projection system. The dual lens projection system, in this case, may include the stereoscopic film projection system 100 shown in FIG. 1, or a stereoscopic digital cinema projector having dual lenses, such as the Sony SRX-R220 4K single-projector system with a dual lens 3D adaptor such as the LKRL-A002 adapter, both products marketed by Sony Electronics, Inc. of San Diego, Calif.

In such dual-lens systems, two images are expected to be included within a single frame. Stereoscopic image pair (R2, L2), which includes right-eye image 111 and left-eye image 112 separated by intra-frame gap 113, is contained within a single image frame 301 shown in FIG. 3. Frame 301 corresponds to a portion of over/under stereoscopic 3D film 110. Frame 301 is analogous to frame 201 for non-stereoscopic film. Each film system, whether stereoscopic or non-stereoscopic, presents one frame of its respective film to the viewer so that one complete image is shown to the viewer for each projected frame.

Figure 3:
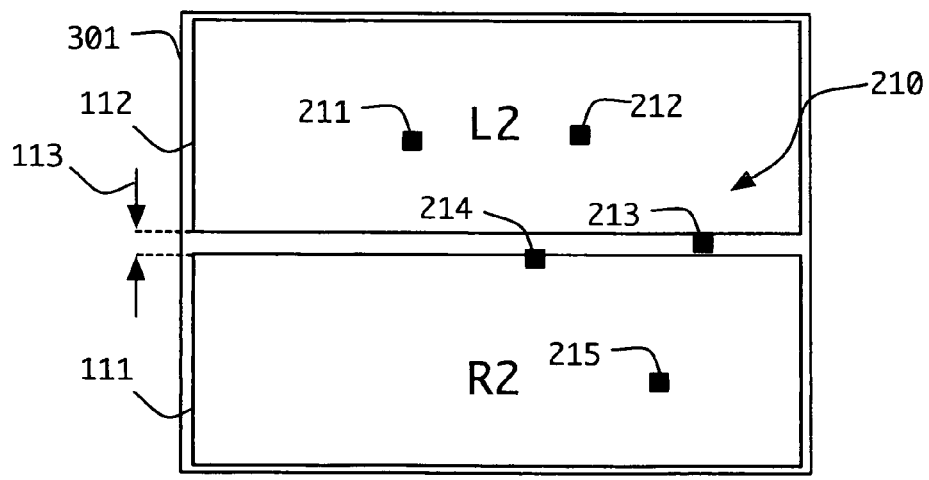
FIG. 3 illustrates a stereoscopic frame overlaid with a non-stereoscopic forensic marking.

From the prior art of frame-based forensic marking, one would expect to insert a single forensic mark into one frame of stereoscopic film, in just the same way as it was performed for non-stereoscopic film. When this marking is performed, the forensic mark as applied to the frame is shown in FIG. 3. Forensic mark 201 occupies the same space and position in stereoscopic frame 301 as it occupied in non-stereoscopic frame 201. As shown in FIG. 3, forensic dots 211 and 212 fall entirely in the region of the left-eye image 112, dot 215 falls entirely in the region of the right-eye image 111, while dot 213 is entirely within the intra-frame gap 113, and dot 214 straddles the edge of right-eye image 111 and lies partly within intra-frame gap 113.

When the stereoscopic frame 301, with its forensic mark applied to the frame similarly to the mark and frame shown in FIG. 2, is projected through a typical dual-lens stereoscopic 3D projector, the resulting forensic mark does not appear similar to the mark from FIG. 2. It is corrupted because it is only partially visible. Even if the mark had been fitted into just one of the images in the image pair for frame 301, the resulting forensic mark 210 would have been severely degraded in contrast and visibility because it would have only been projected to one eye of the viewer through one-half of the stereoscopic dual lens projection system corresponding to the particular marked image in the image pair.

Figure 4:
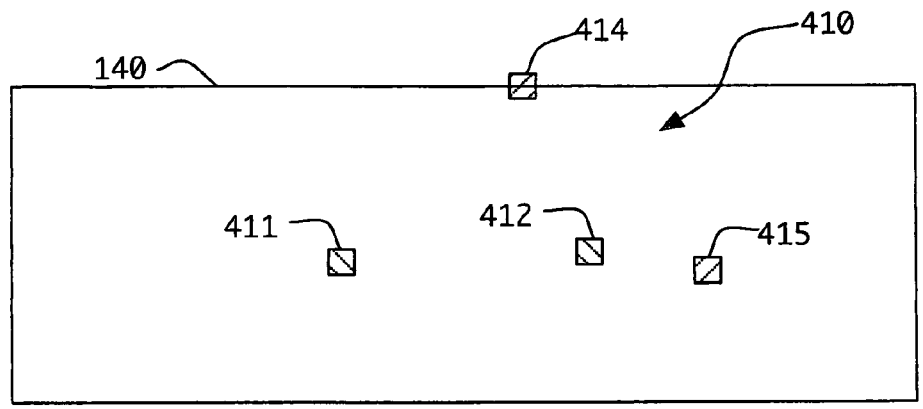
FIG. 4 illustrates the problems that arise for the forensic mark when the frame of FIG. 3 is projected normally through a dual-lens projection system.

FIG. 4 shows a display resulting from projection of forensic mark 201 of FIG. 3, in which a corrupted forensic pattern 410 is at least partially visible on screen 140. Here, forensic dot images 411 and 412 of forensic dots 211 and 212 are visible to an audience member's left-eye since those dots lie in the left-eye image area 112. Forensic dot image 415 and a portion of the forensic dot image 414 are projected onto screen 140 and are visible to an audience member's right-eye because forensic dot 215 and a portion of forensic dot 214 lie within the right-eye image area 111. In a properly adjusted stereoscopic projection system, there would be no projected image corresponding to forensic dot 213, since no portion of the screen 140 is allocated to projecting the intra-frame gap 113 onto the screen.

Further degradation of the corrupted forensic pattern is evidenced by the fact that only one image contributes to the visualization of each forensic dot image 411, 412, 414, and 415, even though both of images 111 and 112 are being projected concurrently. There is no image for the other eye contributing to these images of the forensic dots. For example, the image of forensic dot 211 embedded in left-eye image 112 is projected, but there is no corresponding right-eye forensic dot image superimposed with the left-eye image of the dot. This has the effect of reducing the contrast of each forensic dot image 411, 412, 414, and 415.

In addition, the overall shape of the entire forensic mark can be lost in the projection process as shown in FIG. 4, when using the dual-lens stereoscopic 3D projector for projecting the marked stereoscopic 3D frame.

If a film pirate were engaged in illicitly copying the 3D motion picture containing forensic mark 210 shown in FIG. 4, the illicit copy of the dual lens projected stereoscopic film would be far less affected by the presence of forensic dots 211-215 than when the same pattern is applied to a frame of non-stereoscopic film and is projected non-stereoscopically. That is to say, the illicit copy may have very few detectable traces of a forensic mark.

For instance, if the pirate were using a camcorder without lens adapted for 3D viewing, there would be no forensic dot image corresponding to forensic dot 213 on the screen. Forensic dot image 414 would be only partially projected on the screen and might even be partially or wholly obscured by the theatrical masking. For the forensic dots images that are visible such as dot images 411, 412, perhaps part of 414, and 415, the contrast of each image would be drastically reduced by the projection of the other-eye image that does not include a corresponding forensic dot image therein. This would make visibility and detection of the forensic mark and its component dot images harder to achieve.

If the pirate were using a camcorder shooting through a 3D-adapted lens, only certain ones of the forensic dots would be captured based on the type of lens used. For example, when the lens is adapted for a left-eye 3D view, then the illicit recording would capture only forensic dots images 411 and 412. The forensic mark would be lost and the remnants captured by the illicit recording would probably be insufficient to recognize the overall constellation or pattern in forensic mark 210. When the lens is adapted for a right-eye 3D view, then the illicit recording would capture only forensic dot image 415, and partial dot image 414 may not be captured or easily detected in the recording. Again, the forensic mark would be lost and the remnants captured by the illicit recording would probably be insufficient to recognize the overall constellation or pattern in forensic mark 210.

In order to overcome these problems with applying non-stereoscopic forensic marks and non-stereoscopic frame-based marking techniques to stereoscopic 3D film, a new forensic marking scheme has been devised in accordance with the principles of the present invention. This scheme will be discussed primarily in the context of film for the sake of convenience and ease of presentation. It should be understood that the inventive concepts herein apply to other realizations of stereoscopic 3D content media, such as content in video or digital formats.

According to the principles of the present invention, a stereoscopic 3D frame or pair of images is marked using a forensic mark having separate component marks associated with each image view in the frame. The component marks, when projected and properly aligned via a stereoscopic 3D dual lens projection system, are superimposed to form a composite forensic mark. The composite mark formed by the component marks is substantially identical in shape and layout to the projection of the non-stereoscopic mark shown in FIG. 2. When properly projected and aligned, the composite forensic mark should ideally match a master forensic mark from which each component forensic mark is derived. As an example, the pattern of the non-stereoscopic mark of FIG. 2 can be used as a master forensic mark for marking stereoscopic film or digital media.

Figure 5:
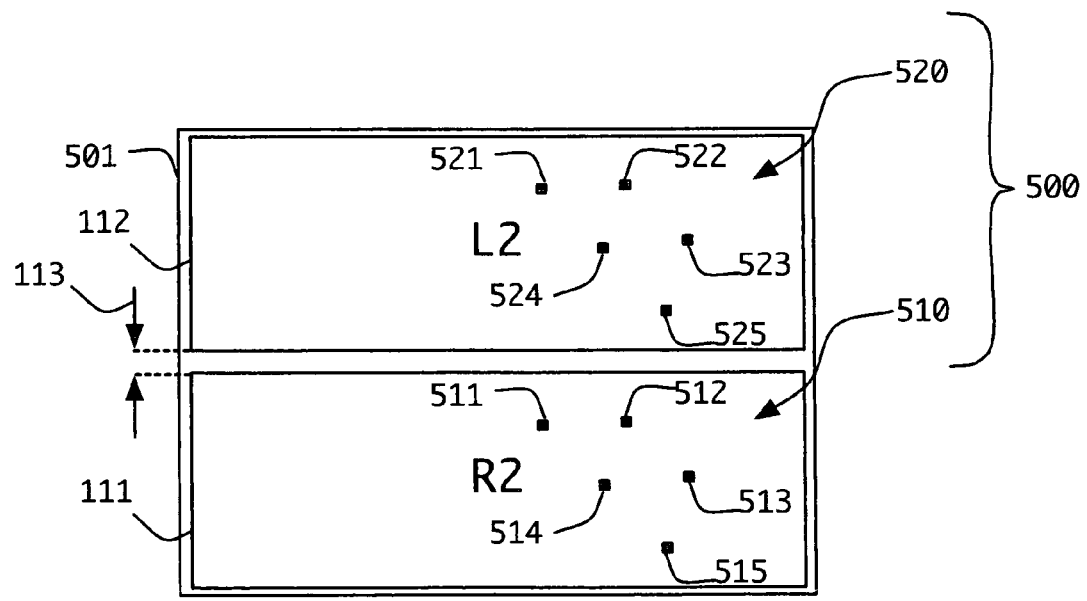
FIG. 5 illustrates a stereoscopic frame overlaid with an exemplary stereoscopic forensic mark realized in accordance with the principles of the present invention.

FIG. 5 illustrates a stereoscopic frame 501 containing stereoscopic forensic mark 500 realized in accordance with the principles of the present invention. One component of mark 500 appears in the left-eye image 112, while the other component of mark 500 appears in right-eye image 111. Forensic mark 500 is comprised of stereoscopic component forensic marks 510 and 520 (or right- and left-component marks), which may also be referred to simply as component marks. Each component mark 510 or 520 is positioned in corresponding locations within the two images 111 and 112 of the stereoscopic pair (R2, L2), and includes a set or constellation of forensic dots 511-515 and 521-525 for the left and right images of the stereoscopic image pair, respectively. In this example, each forensic dot from one image has a corresponding dot in the other image. For this embodiment, one forensic dot is thereby situated substantially in the same location within its respective image as the other corresponding forensic dot is situated within its image. Forensic mark 500, which has identical component marks so that the same dot pattern appears in the same location within each image, is referred to as a symmetric or fully-corresponding mark. The component forensic marks 510 and 520 (that form the symmetric forensic mark) each match the dot pattern of the master forensic mark (e.g., dot pattern of the forensic mark in FIG. 2) completely without exception. That is, the component marks are derived as replicas of the master forensic mark, except for scale changes (e.g., scaling reductions) and possibly characteristic changes such as color, dot size, and the like.

Figure 6:
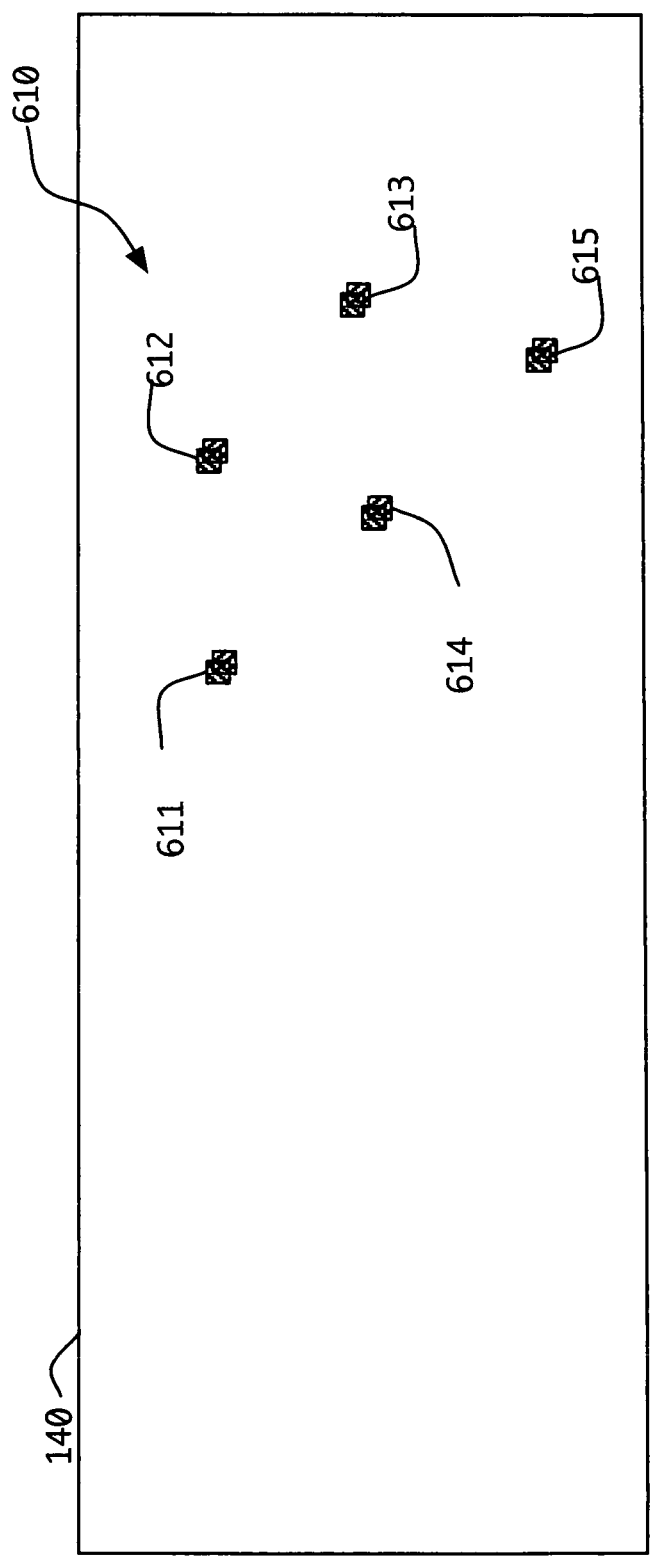
FIG. 6 illustrates a dual lens projection of the forensically marked frame of FIG. 5 by overlaying images of stereoscopic image pair (R2, L2)

When stereoscopic frame 501 is projected by the dual lens stereoscopic projection system, the projected image is shown substantially as depicted in FIG. 6. The composite forensic mark image 610 appears on screen 140, resulting from the stereoscopic projection of forensic mark 500 with its component marks 510 and 520. Composite forensic mark image 610 appears as a set of overlaid or superimposed forensic dot images 611-615, which result from the substantial alignment of each of the projected images of forensic dots 511-515 with the corresponding projected images of forensic dots 521-525. A slight misalignment of the individual corresponding dot images as shown in FIG. 6 is actually exaggerated in this illustration in order to be able to clearly depict the dots from the component forensic marks forming the composite forensic mark. Of course, in a well-aligned stereoscopic projection system, any slight misalignment would be far less noticeable.

Figure 10:
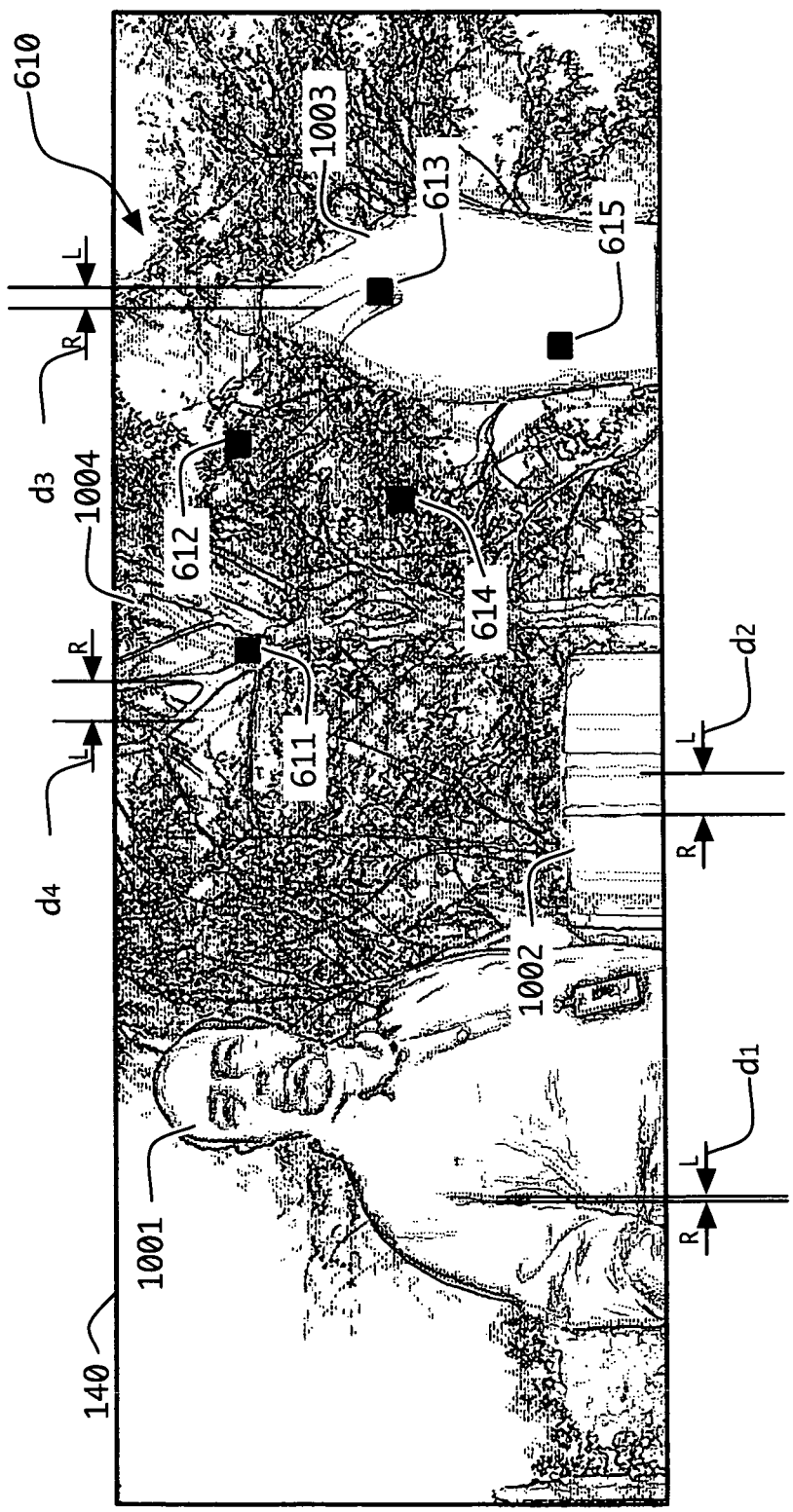
FIG. 10 illustrates a dual lens projected stereoscopic 3D image for the setting shown in FIG. 9.

The result of the projection of frame 501 is that the composite stereoscopic forensic mark image 610 is displayed with the projection of right- and left-eye images 111 and 112. The set of forensic dot images 611-615 in forensic mark image 610 corresponds substantially to the respective constellations in the component forensic marks 510 and 520. An illustration of the composite stereoscopic forensic mark 610 appearing in an actual content scene is shown in FIG. 10, which will be further discussed below.

Figure 7:
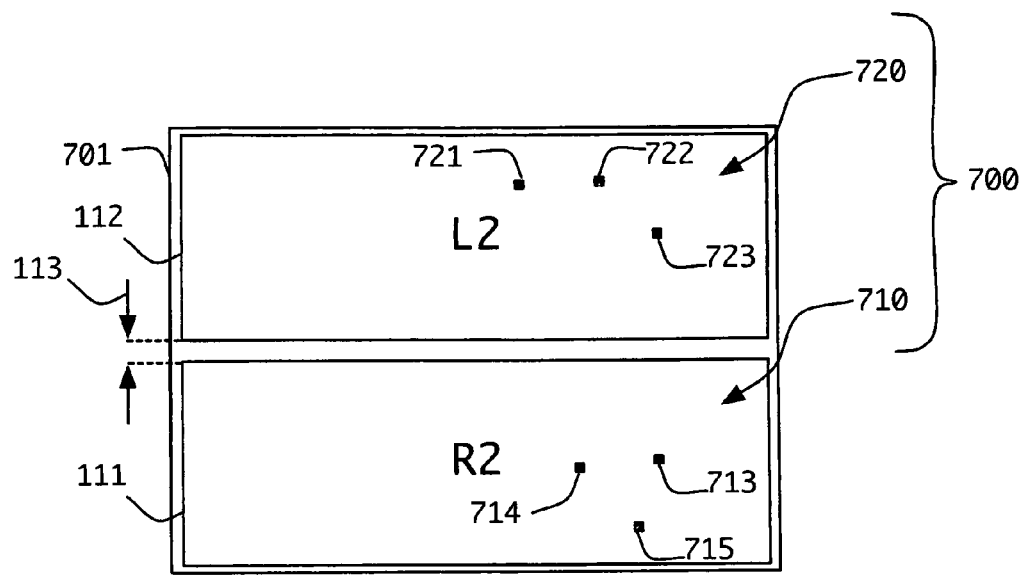
FIG. 7 illustrates an alternative exemplary embodiment realized in accordance with the principles of the present invention in which component constellations of a composite forensic constellation are distributed across two stereoscopic images in the same image pair.

An alternative exemplary embodiment of a stereoscopic forensic mark applied to stereoscopic 3D image pairs is shown in FIG. 7. In contrast to the stereoscopic forensic mark of FIG. 5, the mark in FIG. 7 is an asymmetric or non-fully corresponding mark because the component marks are different from each other in a specific manner. Stereoscopic image frame 701 includes left- and right-eye images 112 and 111, respectively. Frame 701 also is imprinted with forensic mark 700, which includes left- and right-eye image forensic marks 710 and 720 or component forensic marks. In this example, component forensic marks 710 and 720 are generated by eliminating at least one forensic dot from the master forensic mark pattern shown in FIG. 2. Component mark 710 is formed by eliminating dots 211 and 212 from the constellation of dots in master forensic mark 210, and component mark 720 is formed by eliminating dots 214 and 215 from master forensic mark 210.

While the elimination of one or more portions of a constellation for at least one component mark is required to achieve asymmetry, it may also be desired to have both component marks retain some portion of the constellation in common to realize at least one high contrast dot in the composite mark, when the component marks are projected. It is not necessary for the realization of the present invention to have common forensic dots in the component forensic marks of an asymmetric forensic mark. In fact, it is contemplated, in at least one exemplary embodiment, that the component marks can be mutually exclusive of each other as long as the composite mark formed by their superposition, e.g., when component marks are projected in a properly aligned system, includes all the forensic dots of the master forensic mark.

To illustrate this concept, it should be understood that forensic dots 713 and 723 in the two component marks 710 and 720 correspond to each other, each being derived from dot 213 in the master forensic mark 210. Thus, in this example, the component marks retain at least one dot of the constellation in common, though it is not strictly required in the realization of the component marks in accordance with principles of the present invention. A further inspection of the forensic mark 700 shows that forensic dot 721 (e.g., derived from dot 211 of master mark 210) of component mark 720 has no counterpart forensic dot in component mark 710.

Figure 8:
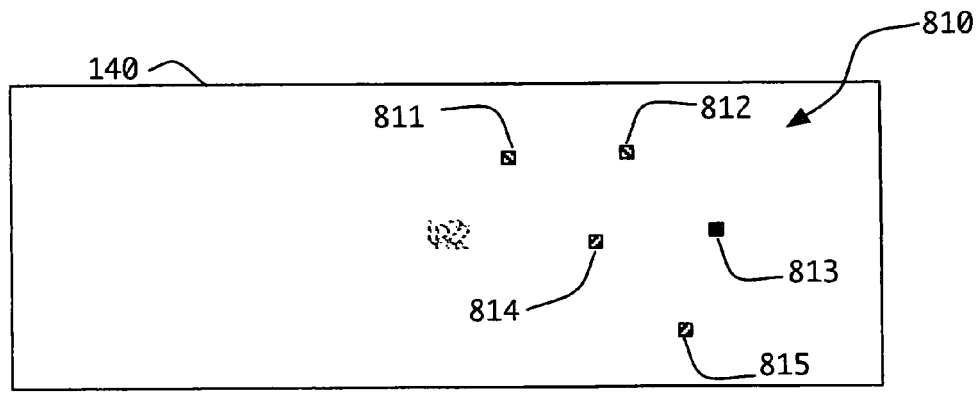
FIG. 8 illustrates a dual lens projection of the forensically marked frame of FIG. 7 by overlaying images of stereoscopic image pair (R2, L2)

When frame 701 is projected by the dual lens stereoscopic projection system, the projected image is shown substantially as depicted in FIG. 8. Composite forensic mark 810 appears as the stereoscopic 3D projection of the components of forensic mark 700. Due to the requirements imposed on the construction of the components for this asymmetric stereoscopic mark, the resulting composite mark resembles the shape and structure of the constellation of dots for the master forensic mark, as shown in similar fashion for projected mark 610. Since certain dots in the composite mark are generated by a single appearance of the dot from a component mark, these certain dots may have a somewhat lower contrast that other dots that include dots from both component marks. For example, forensic dot images 811, 812, 814 and 815 may exhibit a lower contrast than other dots such as dot 813. As noted above, each of the lower-contrast forensic dot images 811, 812, 814 and 815 is formed from only one forensic dot 721, 722, 714, 715, respectively, in frame 701, and that forensic dot is overlaid with the corresponding other-eye image, which does not include the corresponding dot image. Forensic dot image 813 is formed by the superposition of images of two forensic dots 713 and 723. As a result, forensic dot 813 exhibits a high contrast. By having at least one image of a forensic dot (e.g., 813) displayed at full contrast, the lower contrast dot images 811, 812, 814 and 815 may be more easily detected. The positions of the other lower contrast dots are easily determined with respect to the position of the high contrast forensic dot.

When a dot in the composite forensic mark is formed from the projection of only one dot from a component mark from one image in the image pair, the contrast may be affected by the appearance of the corresponding area in the other-eye image of the image pair. Forensic dot 721 from component mark 720 does not have a corresponding dot in the component mark 710. If the area in the right-eye image 111 corresponding to the forensic dot 721 does not sufficiently contrast with the dot 721 (e.g., if the image area in R2 appears dark), but the surrounding area in the left-eye image 112 does provide a sufficient amount of contrast to the dot 721, then the contrast ratio may still be adequate.

Figure 9:
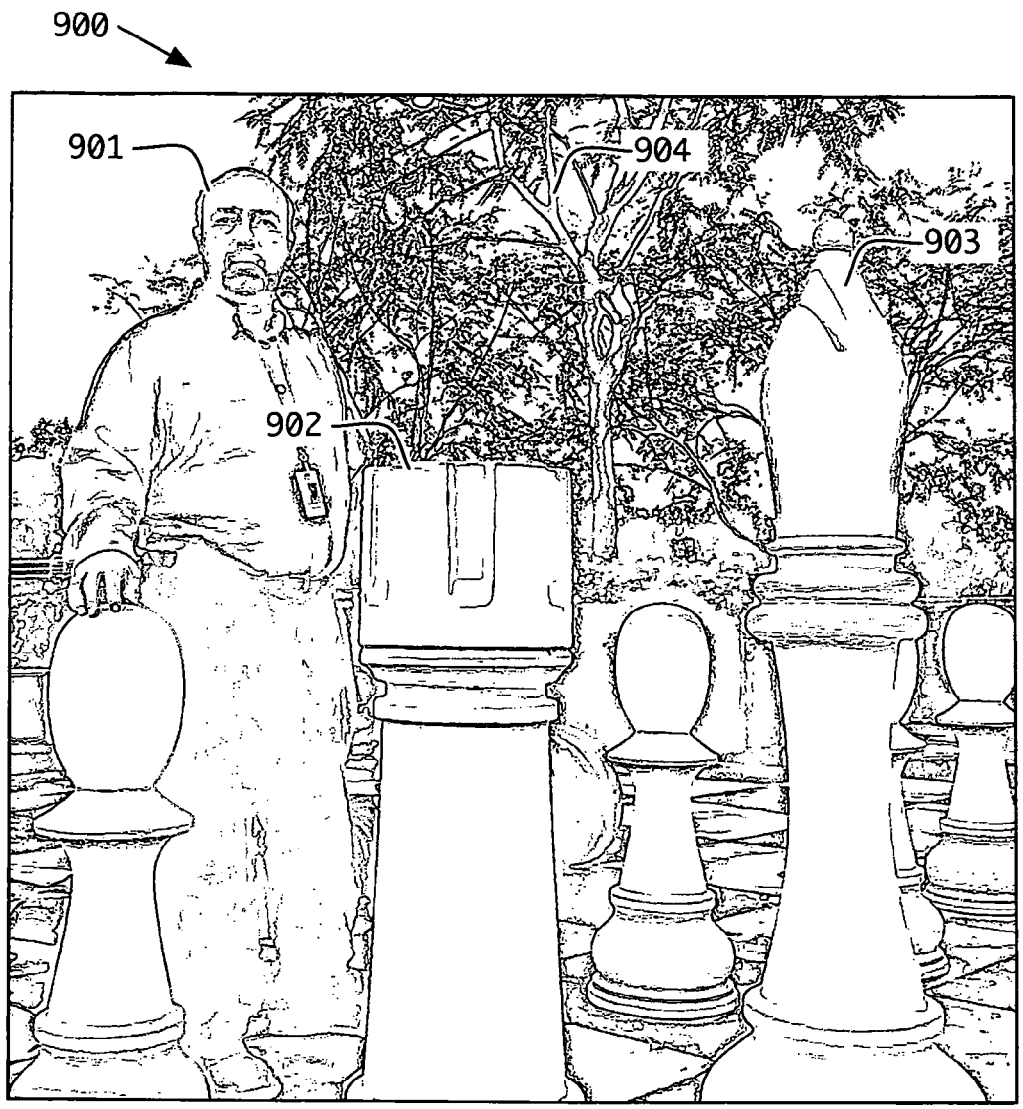
FIG. 9 illustrates a motion picture setting having a number of foreground objects.

FIG. 9 is an illustration of a setting or image 900 having objects such as actor 901 and chess pieces, depicted as rook 902 and bishop 903, in the foreground and an object such as tree 904 in the background. The objects in this illustration are useful in selecting images and preferred regions within the selected images for placement of the forensic marks described herein.

FIG. 10 is a stereoscopic view of setting 900 displayed with a stereoscopic projection system, such as film system 100, onto screen 140. The left and right image views of a stereoscopic 3D image pair are superimposed on the screen by the projection system to create the stereoscopic view shown in FIG. 10. In FIG. 10, the right-eye image view is illustrated with solid lines, whereas the left-eye image view is illustrated with dotted lines.

A brief tutorial about depth perception and disparity is believed to be necessary before proceeding with the remaining description. The sensation or perception of depth is directly related to the horizontal disparity between two image views because of the binocular nature of the viewing process. Binocular here is intended to encompass broadly viewing from two distinct positions, regardless of whether the viewing is performed by eyes or by cameras. Horizontal disparity or simply, disparity, for an object in 3D video refers to the horizontal separation, usually measured in a number of pixels, between the corresponding portions of left- and right-eye images in a stereoscopic image pair. Zero disparity occurs when the pixels of right image view coincide with the corresponding pixels in the left image view. Objects in these image views will then appear at the display screen. Positive disparity indicates that the right-eye pixels appear to the right of the corresponding left-eye pixels from the image pair. Objects exhibiting positive disparity generally appear at a depth perceived to be behind the viewing screen. Negative disparity indicates that the right-eye pixels appear to the left of the corresponding left-eye pixels in the image pair. Objects exhibiting negative disparity generally appear at a depth perceived to be in front of the viewing screen.

Disparity is defined for each pixel in the image with reference to the left and right views. Different pixels, even for the same object in an image, may have different disparity values. Disparity, shown as $d_i$ for i=1, 2, 3, 4 in the figure, is measured as the difference between the left eye's pixel and the right eye's corresponding pixel in a particular image of an object. Disparity is usually expressed as a number of pixels.

The stereoscopic image 1001 of actor 901 is shown having a stereoscopic disparity of $d_1$. That is, a comparison of the pixels in the left and right images in the vicinity of the actor's sleeve shows that the pixels of the right-eye image appear slightly to the left of the corresponding pixels from the left-eye image. Since the right-eye image appears on screen 140 to the left, and the left-eye image appears to the right, an audience member fusing on the image 1001 of actor 901 will tend to be viewing the image slightly cross-eyed, that is, the viewer's vision will converge on that region of the image. For an audience wearing the appropriate 3D glasses, disparity $d_1$ is a small negative amount and it causes stereoscopic image 1001 to appear almost at the surface of the screen, but slightly in front of the screen. Likewise, the stereoscopic image 1002 of rook 902 is depicted with a stereoscopic disparity $d_2$, which appears to also be negative and larger in magnitude than $d_1$. Since disparity $d_2$ is negative and has a greater magnitude, it will cause a viewing audience to perceive the rook 902 as being located closer to the audience and therefore appearing much farther in front of screen 140 than actor 901. The image 1003 for bishop 903 exhibits a negative disparity $d_3$. Since the disparity $d_3$ of bishop image 1003 is also negative and has a magnitude between the magnitudes of negative disparities $d_1$ and $d_2$, image 1003 for the bishop is shown at a depth that is between the respective depths of actor image 1001 and rook image 1002.

In contrast to the previously described images 1001-1003, stereoscopic image 1004 of tree 904 appears in the background, not the foreground. When the eyes of an audience member are looking at the tree image 1004, the vision converges only slightly, if at all, because the stereoscopic disparity $d_4$ for tree image 1004 is positive in sign. Thus, the audience will perceive the tree as lying behind the surface of screen 140, behind objects 901-903.

Forensic mark image 610 of stereoscopic forensic mark 500 is displayed in FIG. 10. In a properly aligned projection system, this forensic mark is expected to result in a constellation of high contrast dot images 611-615. In forensic mark 500, a left-eye image includes the constellation of forensic dots 511-515, whereas a right-eye image includes the constellation of forensic dots 521-525. In this example, both constellations (or left- and right-component marks) are substantially identical so that all forensic dots are in common to the two component marks and therefore coincident when superimposed by the projection system. An audience member is able to see all the dot images 611-615 formed by the coincidence of superimposed forensic dots 511-515 and 521-525, respectively. Since the disparity for the constellations or component marks is substantially zero, forensic pattern 610 appears to be at same depth as the screen 140.

To minimize adverse stereoscopic effects perceived by the audience when forensic marks are displayed, care should be taken to select the scenes into which forensic marks such as marks 500 or 700 will be inserted so that no object overlaid by the forensic mark 500 will have a stereoscopic disparity that places the image of the object in front of the screen 140. Otherwise, if the disparity of the object is negative, the depth cues of stereoscopic convergence and occultation would be contradictory. It is both distracting and destructive of the 3D illusion to have this situation where the mark is behind the object convergence-wise, but the mark also obscures the object visually. This in turn makes the mark appear to be simultaneously behind and in front of the same object. It is considered to be less distracting when a mark overlays an object at a depth that appears to be at or behind the screen. In this case, with the right- and left-eye images of the mark converging at the screen and the objects around the mark appearing at or behind the screen (i.e., non-negative disparity), there is no contradiction in the depth cues of stereoscopic convergence and occultation. The forensic mark appears to be in front of objects in and around (in the vicinity of, or proximate to) the mark, which is consistent with obscuring the visibility of any object behind the mark.

Forensic dot images 611, 612 and 614 all overlay image 1004 of tree 904, which appears behind the screen because of the positive disparity of the pixels in corresponding view images of the tree. For audience members paying attention to the tree, none of these three forensic dot images will be converged. Moreover, since these dots normally appear for only two or three consecutive frames in film 110, the dots 611, 612 and 614 will be even less noticeable than in the prior art non-stereoscopic projection applications of such non-stereoscopic marking having a dot constellation.

In a different area of FIG. 10, forensic dot images 613 and 615 overlay image 1003 of bishop 903. Bishop image 1003 appears to the audience to be in front of screen 140 due to its negative disparity. However, corresponding forensic dots 613 (formed by a combination of dots 513/523) and 615 (formed by a combination of dots 515/525) appear within the image space dedicated to bishop 903. This portion of the forensic mark may be interpreted as one or more features of the bishop. Since the dot images 613 and 615 are converged at the screen, while the bishop image is converged in front of the screen, there is a conflict which may disrupt the audience enjoyment of the stereoscopic illusion, as described above. In this example, an audience would see a conflicting view in which the bishop appears to be far in front of the screen while features contained within the bishop such as the forensic dots 613 and 615 appear to be behind the bishop. Depending upon the specific circumstances, the image content, and the attention of any individual audience member, the 3D effect may be compromised, perhaps significantly so, even in the short duration for which the forensic marks appear.

Thus, in accordance with the principles of the present invention, a policy may be employed to avoid putting stereoscopic forensic marks 500 or 700 into locations of a particular frame where an object in the frame may appear to be imaged in front of the screen. It should be understood that such a policy may have a less stringent application for asymmetrical stereoscopic forensic marks such as mark 700.

In this latter situation, many, if not all, of forensic dots, e.g., dots 714-715 in component mark 710 and 721-722 in component mark 720 do not have a corresponding dot in the opposite eye image. Without such a stereoscopic counterpart, no stereoscopic 3D image can be formed and no depth and occultation discrepancies can arise. To a viewing member of the audience, the dot images in projected forensic mark image 810, except for dot 813, do not have a stereoscopic counterpart in the other-eye. When a forensic dot does not have a counterpart dot in the opposite eye image, the dot does not have any depth cue (other than occultation) and therefore it appears to have an indefinite 3D presence. Thus, there is no issue for convergence that would cause conflict with the disparity of objects in the underlying image.

Since forensic mark 700 is comprised of two different component forensic marks 710 and 720, in which at least one component mark has one or more forensic dots that do not have counterparts in corresponding locations of the other component mark, then the forensic mark 700 may be placed with less concern for stereoscopic interference occurring with foreground objects such as image 1003 of bishop 903. The same is not true for symmetric forensic mark 500, which should be placed in zero or positive disparity image areas (i.e., objects in those areas having non-negative disparities) of each image for the frame pair.

A process 1100 is shown in FIG. 11 for creating and generating stereoscopic forensic marks in accordance with the principles of the present invention. In the start step 1101, the overall size of the forensic mark is selected. This selection step considers the size without regard necessarily to positioning of the mark in order to avoid having any dot or mark pattern being so large that it will be near the edges of a projected image. Consideration is also given to the aspect ratio of the content with which the forensic marks are used.

In step 1102, a master forensic mark is generated (typically using software such as those known to one skilled in the art), which, in one example, corresponds to the set or pattern or constellation of dots that would appear when projected and viewed without 3D glasses, as with forensic mark images 610 and 810. This master mark is intended to fit within the overall size constraint selected in start step 1101. If one or more master marks are already created or otherwise available, the mark to be used for a particular motion picture can be selected from the available marks.

In step 1103, the master mark is reduced in size and replicated to form a stereoscopic forensic mark such as mark 500 suitable for application to a stereoscopic image pair in frame 501. The stereoscopic forensic mark is comprised of two components marks, such as right- and left-eye forensic marks 510 and 520, which are identical to each other. Mark 500 is a symmetric or fully corresponding mark in which the component marks are identical to each other, exhibiting identical dots or patterns with the same offset or spatial arrangement within each view image. The size reduction of the master mark includes reducing from a size used for non-stereoscopic 2D marking to a size suitable for stereoscopic marking, e.g., reducing the size by about a half so that the component marks can fit within their respective left- and right-image areas in a single stereoscopic frame. Size adjustments may be performed as needed according to factors such as size of the frame on the film, mechanical setups at specific facilities (e.g., layout of projector or printer for burning the marks onto films), among others.

At step 1104, a determination is made whether to provide a symmetric stereoscopic mark (e.g., mark 500 where each forensic dot in one component mark has a counterpart in the other component mark), or to provide an asymmetric mark (e.g., mark 700, in which at least one dot in one component mark does not have a counterpart in the other component mark and wherein the component marks combine to form the master mark via the composite mark upon projection. If a symmetric mark is required, the mark from step 1103 is already compliant and process transfers control directly to step 1106.

If an asymmetric mark is required, then the master mark is modified in step 1105 to provide the asymmetric mark, in which the component marks are different in some respect as described above. This difference can be achieved in different manners, such as by removing at least one dot from a first component mark while retaining the corresponding dot in the second component mark. Different dots can be removed from the component marks, as long as the resulting component marks are not identical to each other. The resulting composite mark formed by the superimposed projection of the two component marks then resembles the desired stereoscopic forensic master mark.

At step 1106, a record is made of the stereoscopic forensic mark for later use when applying the mark to the stereoscopic content. The nature of the record of the stereoscopic forensic mark is dependent on how and when the mark is to be applied. If the mark is to be applied by a digital cinema server or dual lens digital projector, the record may be a digital image file, such as a portable network graphics (PNG) file that includes an alpha-channel transparency layer for use in dynamically overlaying the forensic mark into the stereoscopic image. If the stereoscopic mark is to be applied by the digital cinema server, the mark may be recorded as separate right- and left-eye forensic mark files (also PNG files), or as metadata representing the appropriate offset for alignment of the stereoscopic forensic mark file may accompany the combined stereoscopic file.

If the mark is to be applied to a film print, the stereoscopic forensic mark can be recorded in the appropriate format required by the film printing equipment. For example, one format may be a proprietary format listing dot coordinates in a stereoscopic image frame. The {x, y} coordinates of all the dots in image frame 501 or 701 can be used to control a laser with which the mark is burned into film. Another format may be a digital image file capable of being written to film, either before or after being developed. Yet another format may be a frame of film such as a slide or a short loop of frames (e.g., a high contrast film) which is used to expose the forensic mark onto film before it is developed. In any case, the record of the stereoscopic mark should be able to be transformed into whatever format is needed by the equipment applying the forensic mark to the content, whether the content is based in film or digital cinema.

At step 1107, a record is made of the master mark, e.g., by logging to a database. If the right- and left-eye forensic marks are different from the master mark (i.e., an asymmetric mark), then the record or log will also include the component marks for the right- and left-eye images of the forensic mark. This record is useful because, depending on how a pirate equips a camcorder, an illicit recording might capture images containing the whole mark (if the pirate uses no filters over the camcorder, or if a symmetric stereoscopic mark was used), or just the right- or left-eye marks (if asymmetric stereoscopic marks are used and if the pirate uses a right- or left-eye glasses filter). The record made here assures that a forensic mark can be authoritatively detected and identified in an illicit recording by comparing the recorded or logged master mark with marks from various recordings of the content or motion picture. The generation of the forensic mark is completed at step 1108.

FIG. 12 shows one embodiment of a process 1200 for applying a stereoscopic forensic mark to stereoscopic motion picture content. Process 1200 begins at step 1201, in which selection occurs for a stereoscopic motion picture sequence to be marked and for the stereoscopic forensic mark or marks to be applied to the picture. In other words, a motion picture or a sequence (e.g., a film reel or certain scenes in the picture), for which forensic marking is desired, is identified along with the mark(s) that are to be used.

While more than one stereoscopic forensic mark may be used throughout a picture sequence in different combinations in order to provide different identifications for different projectors, the following description assumes that only one mark is used for ease of discussion. Combinations of marks in certain designated sequences and at certain designated locations of a film can be combined as multiple degrees of freedom used to identify uniquely a region, a theater, and even a projector used in presenting the content. It is assumed that the locations (or segments) where that mark appears in the motion picture sequence provide the primary forensic element by which one can identify the projector or theatre. This is contrasted with the scenario in which various marks of a plurality of stereoscopic forensic marks are applied at a specific set of locations in the sequence of image pairs. This is not by way of limitation, but merely to simplify the following discussion.

At step 1202, a location or segment in the stereoscopic motion picture sequence is selected for application of the stereoscopic forensic mark. The location or segment refers to a series of two or more consecutive stereoscopic frames. In one example, the series of frames is relatively short and may only correspond to fractions of a second in duration. The number of frames to be marked can vary according to the frame speed of the motion picture. In one example involving a film, the segment to be marked may include 2 to 12 frames presented at 24 frames per second. In the case of an asymmetric mark, which has a lower contrast in comparison to a symmetric mark, one may allow the mark to be shown for a longer time period and therefore over a larger number of frames.

Different criteria may apply to the selection of the film sequence. In general, it is found from experimental practice that scenes with a lot of motion or camera movement should be avoided for forensic marking. These scenes include, but are not limited to, fast moving content scenes, multiple jump cuts, scenes involving camera panning, and the like. This criterion has been determined because many video compression formats, in struggling to keep up with the motion in a scene, may and usually do neglect tiny details that might represent the image of a forensic dot. As a result, the forensic dots may be effectively erased from a sequence of scenes involving a lot of camera and/or content motion. Thus, in one embodiment, the sequence of scenes selected for forensic marking exhibits relatively little motion or substantially slow motion, at least for objects in the proximity of the forensic dots.

Another criterion may ensure that the frames in a selected location exhibit sufficient contrast with each forensic dot in the stereoscopic forensic mark. It may be useful to avoid selection of a black frame, or a frame with dark objects that might obscure a forensic mark. Stereoscopic forensic marks can permit a less restrictive criterion in which it may be sufficient to ensure that at least one dot in either the right- or left-eye forensic mark corresponding to each dot in the master forensic mark lie with surroundings in the associated view image that provide a high contrast. In experimental practice, it has been determined that, for superior forensic detectability results, marks should ideally be written into film sections (i.e., segments or sequence of the motion picture) that are light and not dark or dim. In a related observation, it has been determined by the inventors that marks should be placed in regions that avoid close-ups of content, especially facial close-up images. While these close-up views may provide sufficient lightness of content, the presence of a mark can be annoying or disruptive to the viewing audience.

Another criterion may state that a selected segment have no frames in which the stereoscopic images present an object in front of the screen, that is, with negative disparity. Alternatively, an analysis of the stereoscopic images may be employed to ensure that there are no foreground objects (i.e., appearing at a depth in front of the screen) that would be overlaid by any stereoscopic forensic dots. In the case of an asymmetric stereoscopic forensic mark, this criterion may be waived or ignored for the reasons given above.

Once the location or segment in the motion picture sequence is selected at step 1202, an association is made between the location (or individual frames) and the stereoscopic mark to be applied, and the association is recorded or logged at step 1203. In the case of digital cinema, this record might take the form of metadata, using a subtitling mechanism from Derrenberger, US published patent application 2009/0123022. In the case of film, this record may take the form of data suitable for controlling the film marking system as explained in the Antonellis patent described above. This record is also preserved for use in later forensic analysis to determine the specific theatre where the piracy allegedly took place. This record will permit the reconstruction of all the structural and location information for any forensic mark.

At step 1204, a check is made to determine whether there are more frames or segments to be selected for marking. If there are more frames to be marked, the process 1200 loops back to step 1202. Otherwise, processing continues at step 1205.

At step 1205, based on the records from step 1203, the stereoscopic forensic mark is overlaid onto the frames of the stereoscopic presentation for the selected segment(s). This step may occur, for example, as the film is being printed (e.g., see Antonellis, U.S. Pat. No. 7,206,409), or as the digital cinema server is playing out to the projector (e.g., see Derrenberger, US published patent application 2009/0123022). The overlay can be performed in different manners. For example, the entire stereoscopic forensic mark—both component marks for the left- and right-eye images—can be applied to the whole frame. Alternatively, the overlay may be repeated once for the right-eye image of each frame at the location being overlaid with the right-eye forensic mark, and again for the corresponding left-eye image being overlaid with the left-eye forensic mark.

Once stereoscopic motion picture content is marked with stereoscopic forensic marks, additional processing can be performed as understood by one skilled in the art to prepare the picture for display in a theatre at optional step 1206. At this point, if a pirate makes an illicit recording of the motion picture, the stereoscopic forensic marks will be visible in the recording and sufficient records will exist as to allow those stereoscopic forensic marks to reveal the theatre in which the illicit recording had been made.

A method has been disclosed for providing forensic marking for use in 3D projection. The stereoscopic forensic mark includes two component marks for use with a stereoscopic image pair. The two component marks may be identical to, or different from, each other. Each component mark includes at least one dot or other suitable geometric shape. In one example from experimental practice, each component mark includes a set of geometric shapes or dots, arranged in a particular pattern for that component mark.

Component marks may differ in the number of dots, the specific shapes used, the size and/or the spatial distribution or arrangements of the dots or shapes. In this description, component marks have been shown having five or fewer forensic dots exhibiting a certain spatial layout (e.g., non-linear configuration). It should be understood that the constellation, especially for the master mark from which the component marks are derived, may include any number of forensic dots necessary to generate a unique, detectable, and traceable forensic mark in the stereoscopic images. The shape and/or spatial configurations of the forensic dots can be varied along with its color and/or shading. It is generally preferred that the dot shape and coloring be maintained similarly in associated component marks of a particular forensic mark.

When the master forensic mark is reduced in size—usually by scaling in a proportional manner—during the generation of component forensic marks, the orientation of the master mark may also be changed to provide an additional degree of freedom used for uniquely identifying a copy of the film and its theater of presentation. The new orientation is then imparted from the master mark to the component forensic marks when they are written onto the stereoscopic film images. In one example, the spatial relationship of the forensic dots for the master forensic mark and proportions of the master forensic mark are maintained after size reduction. Thus, forensic marks that are different in one or more aspects (e.g., number, shape, size and/or spatial configuration of dots or features) can be used for distinguishing among pictures intended for different theatres or facilities.

Component marks are associated with at least two consecutive frames (or selected frames) in a motion picture. The motion picture may be provided in conventional film format, such as a 35 mm film, a digital image file, or a video format. During presentation or playout of the motion picture, the image content in the selected frames are presented or projected at the same time with the component marks associated with the frames.

It will be appreciated by persons skilled in the art that it is preferred to have all of the dots or geometric shapes in each component mark provided (i.e., written) within an area corresponding to the area of the respective stereoscopic image, so that none of the forensic dots or geometric shapes overlap the inter-frame gap or the intra-frame gap for the stereoscopic image pair.

One or more steps or procedures in the method can be performed manually or automatically, such as by a processor executing program instructions for implementing one or more of these steps, or by a combination of both. Automated steps can be performed in a manner substantially similar to the steps discussed above in other examples. Furthermore, the exemplary methods may also be modified by omitting and/or combining one or more steps. Thus, a forensic mark can be formed based on the master forensic mark without necessarily forming first a symmetric mark, and then modifying the symmetric mark to form an asymmetric mark. Instead, an asymmetric mark can be formed by modifying the master forensic mark to form a first component mark, and replicating the master forensic mark to form a second component mark that is different from the first component mark.

A system and a computer readable medium are also provided for implementing the method of the present invention. For example, the system may include one or more processors, memory devices and so on, and the computer readable medium may be programmed to contain instructions for implementing various steps related to the method of the present invention. The computer readable medium may include a hard drive, removable storage, read-only memory, random accessible memory, and the like, which includes program instructions stored thereon. These instructions, when executed by one or more processors, can implement one or more steps of a method as discussed above. It will be appreciated that the one or more processors can be an integral part of the projection system, or can be provided separately from and as an adjunct to the projection system.

It will be understood by persons skilled in this art that the forensic marks taught herein can be written onto the film at various stages in the film production process. A camera recorder can be adapted to write each type of indicating mark. Furthermore, during the production of a conformed negative, each indicating mark could also be written onto the film. Other stages in film production may also be more or less adaptable to the writing of these indicating marks. Writing techniques are well known in the art and are not described further herein.

All examples and conditional language recited herein are intended for pedagogical purposes to aid the reader in understanding the present principles, and are to be construed as being without limitation to such specifically recited examples and conditions.

Moreover, all statements herein reciting principles, aspects, and embodiments of the present invention, as well as specific examples thereof, are intended to encompass both structural and functional equivalents thereof. It is intended that such equivalents include both currently known equivalents as well as equivalents developed in the future, including any elements developed at any that perform the same function, regardless of structure.

A number of implementations have been described herein. Nevertheless, it will be understood that various modifications may be made. For example, one or more elements of different implementations may be combined, supplemented, modified, or removed to produce other implementations. Other structures and processes may be substituted for those disclosed and the resulting implementations will perform at least substantially the same function(s), in at least substantially the same way(s), to achieve at least substantially the same result(s) as the implementations disclosed. Although illustrative embodiments have been described with reference to the accompanying drawings, the present principles are not limited to those precise embodiments, and various changes and modifications may be effected by one of ordinary skill in the pertinent art without departing from the scope or spirit of the present principles. Accordingly, these and other implementations are contemplated by this application and are within the scope of the following claims.

What is claimed is:

1. A stereoscopic motion picture comprising:
a plurality of stereoscopic image pairs arranged in sequential order;
a first forensic mark formed over a portion of a first image of a stereoscopic pair; and
a second forensic mark formed over a portion of the second image of the stereoscopic pair, the portion of the second image corresponding spatially to the portion of the first image;
wherein each of the first and second forensic marks includes a plurality of forensic dots, and which collectively produce a composite forensic mark when the forensic marks are superimposed on each other.

2. The stereoscopic motion picture according to claim 1, wherein the first and second forensic marks are substantially identical to each other.

3. The stereoscopic motion picture according to claim 1, wherein the first and second forensic marks are different from each other, and wherein at least one forensic dot of the plurality of forensic dots of the first forensic mark lacks a corresponding forensic dot in the second forensic mark.

4. The stereoscopic motion picture according to claim 3, wherein at least one forensic dot of the plurality of forensic dots of the second forensic mark lacks a corresponding forensic dot in the first forensic mark.

5. The stereoscopic motion picture according to claim 1, wherein the portion of the first image of the stereoscopic pair exhibits a non-negative disparity with respect to the corresponding portion of the second image of the pair, at least in a vicinity of each forensic dot included in the first and second forensic marks.

6. The stereoscopic motion picture according to claim 1, wherein a sequence of stereoscopic pairs includes the first and second images having the first and second forensic marks therein, the sequence exhibits substantially slow motion at least in the corresponding portions of the first and second images of the pair.

7. The stereoscopic motion picture according to claim 1, wherein the first forensic mark includes at least one forensic dot having a corresponding forensic dot present in the second forensic mark.

8. The motion picture according to claim 1, wherein the plurality of stereoscopic images and forensic marks are provided in a digital cinema image file.

9. The motion picture according to claim 1, wherein the plurality of stereoscopic images are provided in at least one digital cinema image file and the forensic marks are provided in at least one overlay file.

10. The motion picture according to claim 1, wherein the plurality of stereoscopic images and forensic marks are provided in a film print.

11. A method for producing a stereoscopic motion picture with forensic marks, the motion picture having a plurality of stereoscopic image pairs arranged in sequential order, the method comprising:
   providing a master forensic mark comprising a plurality of forensic dots arranged in a desired pattern;
   forming a first forensic mark based on the master forensic mark for application to a first image of a stereoscopic pair;
   forming a second forensic mark by replicating the master forensic mark for application to a second image of the stereoscopic pair;
   wherein an aligned superposition of the first and second forensic marks over each other produces a composite forensic mark exhibiting substantially identical characteristics to the master forensic mark with respect to a total number of forensic dots in the master forensic mark and with respect to a spatial representation of the master forensic mark; and
   recording the plurality of stereoscopic image pairs on a non-transitory medium to produce the stereoscopic motion picture, wherein at least one of the stereoscopic image pairs is recorded with the first and second forensic marks wherein one or more of the providing, forming and recording steps are performed by one or more processors.

12. The method of claim 11, wherein the step of forming the first forensic mark comprises replicating the master forensic mark.

13. The method of claim 11, wherein the step of forming the first forensic mark comprises eliminating at least one forensic dot from the master forensic mark.

14. The method according to claim 13, wherein the step of forming the second forensic mark further comprises:
   eliminating one or more forensic dots from the second forensic mark, wherein the one or more forensic dots eliminated from the second forensic mark have a corresponding forensic dot retained in the first forensic mark.

15. The method according to claim 14, wherein the first forensic mark includes at least one forensic dot having a corresponding forensic dot present in the second forensic mark.

16. The method according to claim 11, further comprising:
   writing the first forensic mark over a portion of the first image of the stereoscopic pair; and
   writing the second forensic mark over a portion of the second image of the stereoscopic pair, the portion of the second image corresponding spatially to the portion of the first image.

17. The method according to claim 11 further comprising:
   analyzing each of the first and second images to identify the portions of the first and second images of the stereoscopic pair, wherein the portion of the first image of the stereoscopic pair exhibits a non-negative disparity with respect to the corresponding portion of the second image of the pair, at least in a vicinity of each forensic dot included in the first and second forensic marks.

18. The method according to claim 11, further comprising:
   identifying a sequence of stereoscopic pairs including the first and second images having the first and second forensic marks therein, the sequence exhibits substantially low motion at least in the corresponding portions of the first and second images of the pair.

19. The method according to claim 11, wherein the replicating includes:
   reducing a size of the master forensic mark while maintaining both a spatial relationship of the plurality of forensic dots for the master forensic mark and proportions of the master forensic mark after size reduction.

20. The method according to claim 11, wherein the replicating includes: changing an orientation of the master forensic mark.

21. The method according to claim 11, wherein the stereoscopic pair and the forensic marks are recorded in a digital cinema image file.

22. The method according to claim 11, wherein the stereoscopic pair is recorded in at least one digital cinema image file and the forensic marks are recorded in at least one overlay file.

23. The method according to claim 11, wherein the stereoscopic pair and the forensic marks are recorded on a film print.

* * * * *